Aug. 24, 1943.   O. MINTON   2,327,364
ELECTRICAL APPARATUS AND ITS OPERATION
Filed Oct. 12, 1939
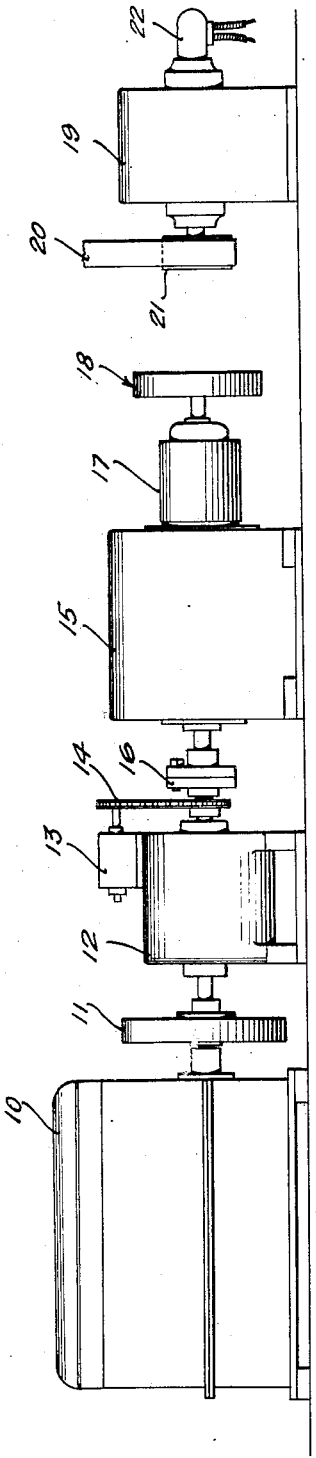
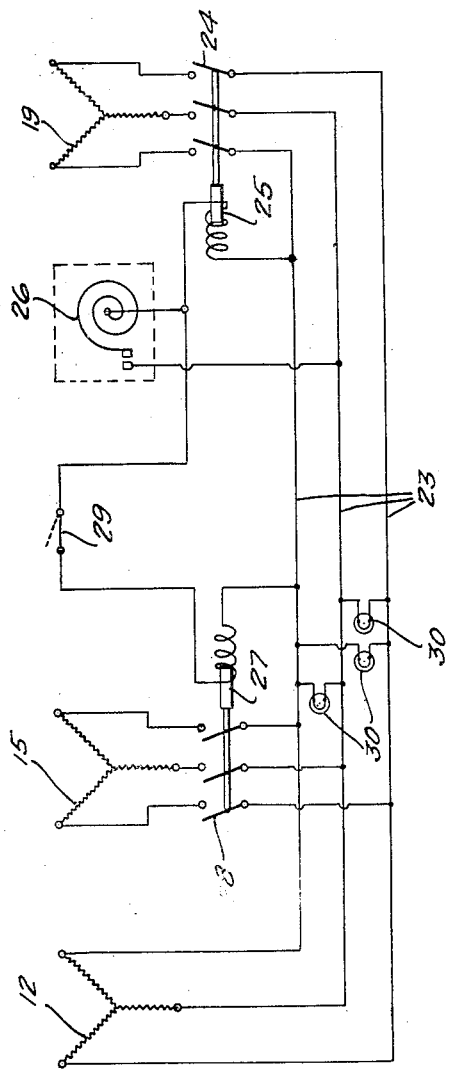
INVENTOR
OGDEN MINTON
BY
ATTORNEY Patented Aug. 24, 1943

2,327,364

UNITED STATES PATENT OFFICE 2,327,364

ELECTRICAL APPARATUS AND ITS OPERATION

Ogden Minton, Greenwich, Conn., assignor to He-Li-Po, Inc., Greenwich, Conn., a corporation of Connecticut Application October 12, 1939, Serial No. 299,077

5 Claims. (Cl. 171—118)

This invention relates to electricity and more particularly pertains to electrical apparatus and its operation.

In small electrical power plants, it frequently happens that one or more electric motors of considerable capacity must be operated intermittently. The starting of any one of such motors requires an inrush of current in the power line which may be as much as five times the amount of current required to operate the motor after it has been started. In consequence, unless the main generator is large enough, the motor cannot be started at all, or unless the main generator is oversize, there will be a loss of voltage and serious injury to the motor will occur unless it is protected by a low voltage cut-out.

Heretofore in electrical power plants of this character, it has been necessary to install a main generator which is of sufficient capacity to start the motors that may be thrown across the line intermittently. This arrangement makes it necessary for a large capacity generator to be operating under a comparatively light running load. It is well known that generators operate at very low efficiency unless they are operated at some substantial part of their rated capacity. For example, this efficiency may fall lower than twenty-five percent (25%) at light loads, whereas it may be as high as ninety percent (90%) at loads of seventy-five percent (75%) of capacity. Accordingly, in prior practice, generators in power plants of the type mentioned operate at very low efficiencies normally, and only perform at reasonably high efficiencies during the short intervals of time required to start the one or more motors in the plant.

The present invention overcomes this disadvantage and provides an electrical power plant of the type referred to, which has a generator of sufficient capacity to carry the running load of the plant, and is provided with other means for starting the one or more motors or operating other current consuming devices from time to time. The invention makes it possible to operate the generator at a high efficiency at all times, and to start the motors and operate other devices in circuit automatically.

The invention will be understood from the following description when considered in connection with the accompanying drawing forming a part thereof, and in which:

Fig. 1 is an elevational view, showing more or less diagrammatically, an electrical power plant embodying the invention, and Fig. 2 is a wiring diagram of the power plant shown in Fig. 1.

Referring to the drawing, reference character 10 designates an internal combustion engine of any suitable form, having a flywheel 11 mounted on the engine shaft which drives a three-phase alternating current generator 12 having a capacity of 20 k.w., for example. The exciter 13 for generator 12 is driven from the generator shaft by any suitable means such as the chain and sprocket arrangement 14. An alternating current generator 15 having a capacity of 40 k.w. for example, is coupled mechanically directly to the shaft of generator 12 by means of a coupling 16 which is adjustable and is so adjusted that the generators 12 and 15 are always in phase with each other. Generator 15 has an exciter 17 and a flywheel 18 mounted on its armature shaft. An electric motor 19, for example a 10 k.w. motor, drives some device not shown, such as a refrigerating compressor, through a belt 20 running over a pulley 21 on one end of its shaft. In the form shown, the starting and stopping of electric motor 19 is controlled by a thermostat 26. A centrifugal switch 22 of any suitable form, is mounted on and is driven by motor 19, and is so arranged that it breaks an electrical circuit when the motor 19 comes up to full speed.

Motor 19 is connected into and disconnected from the main circuit 23 with which the generator 12 is continually connected, by a normally open switch 24 which is closed by a solenoid 25. The energization of the solenoid is controlled by the thermostat 26, as shown, which is connected across the main circuit 23. Thermostat 26 also controls the energization of a solenoid 27 which closes a normally open switch 28 which connects generator 15 with the main line 23. A normally closed switch 29 which is in electrical circuit with and is controlled by centrifugal switch 22, controls the circuit connecting the thermostat and the winding of the solenoid 27. A lighting load 30 of 10 k.w. for example, is connected in the main circuit. The exciter circuits and the voltage regulator circuits have been omitted for the sake of simplicity, since they form no part of the invention.

In operation, the engine 10 is started and is kept running at some predetermined speed by a governor, and drives the generators 13 and 15. Flywheel 18 is made of adequate weight and diameter to store sufficient energy to prevent a falling off in speed of the power plant over a sufficiently long period of time to permit the starting of motor 19. Assume that lighting load 30 is on and that the thermostatic control 26 calls for motor 19 to start. Since, in the example given, this motor is a 10 k.w. motor, it may require as much as 50 k.w. to start it, whereas it will require only 10 k.w. to keep it running. When the time arrives for the motor 19 to start, the switch of the thermostat 26 closes, coils 25 and 27 are energized and close switches 24 and 28 and connect motor 19 and generator 15 into the main line 23. With both generators 12 and 15 operating, and with the 10 k.w. lighting load on the line, there will be available 50 k.w. capacity of current to start the motor 19, which is ample to effect the starting of this motor. The flywheel 18 has sufficient energy stored in it to keep the speed of the power plant from dropping too much during the time the motor 19 is getting up to full speed. Ordinarily, it will require from 3 to 7 seconds for motor 19 to attain its normal speed and when this speed is reached, the centrifugal switch 22 operates to open switch 29 and to break the circuit to the coil of solenoid 27, opens switch 28 and cuts generator 15 off the line. Switch 24 will remain closed and motor 19 will continue to run until the thermostat 26 breaks the circuit to the coil of solenoid 25 and opens switch 24. Then motor 19 will stop, centrifugal switch 22 will close switch 29, and the power plant is ready for another starting of motor 19.

From the foregoing description, it will be perceived that the generator 15 only comes on the line when some abnormally large load, such as results from the starting of motor 19, is thrown on the line. The remainder of the time the generator 15 runs idle and acts like a flywheel. Hence the generator 12 will operate at all times at a high efficiency and the motor 19 may be started and stopped at will, without interfering with the operation of the generator 12.

Under some circumstances, the flywheel 18 may be omitted because the engine flywheel 11, and the generators 12 and 15 may provide an adequate flywheel effect. In the example given, the engine 10 need have a capacity only sufficient to carry the load of 20 k. w. made up of the lighting load 30 of 10 k. w. and the motor load 19 of 10 k. w. In consequence, it will be understoood that both a mechanical and an electrical flywheel effect is produced by utilizing this invention.

If desired, a switch similar to the switch 28 and similarly operated, may be used to throw the exciter current off and on. Or, the exciter current may be maintained at all times.

The capacities mentioned herein for the several parts of the system disclosed, are to be considered as illustrative only, and are not to be taken as limiting the scope of the invention in any way. Obviously, the size and capacity of the individual parts of the system may be varied as desired, within the limits of the invention.

Since changes may be made in the form of the invention selected for illustration and in the several parts thereof, and in their location in the system without departing from the principles of the invention, it will be understood that the invention is not to be limited excepting by the scope of the appended claims.

What is claimed is:

1. An electrical power plant comprising an alternating current generator, a current consuming device connected in circuit with the generator, an electric motor, the generator having a capacity sufficient to operate said current consuming device and motor but insufficient to start said motor, a second alternating current generator having its armature shaft mechanically coupled to the armature shaft of the first generator in such manner that the two generators are always in phase with each other and having a capacity sufficient to start the motor in conjunction with the first generator, switch means responsive to a condition requiring the starting of said motor for connecting the motor in circuit with both said generators, and speed responsive switch means for disconnecting the second generator from said motor when the motor has been started.

2. An electrical power plant comprising an alternating current generator, a current consuming device connected in circuit with the generator, an electric motor, the generator having a capacity sufficient to operate said current consuming device and motor but insufficient to start said motor, a second alternating current generator having its armature shaft mechanically coupled to the armature shaft of the first generator in such manner that the two generators are always in phase with each other and having a capacity sufficient to start the motor in conjunction with the first generator, switch means responsive to conditions requiring the starting and stopping of said motor for connecting the motor in circuit with both said generators when the motor is to be started and for disconnecting the motor from the first generator when operation of the motor is not required, and speed responsive switch means for disconnecting the seond generator from said motor when the motor has been started.

3. An electrical power plant comprising an alternating current generator, a current consuming device connected in circuit with the generator, an electric motor, the generator having a capacity sufficient to operate said current consuming device and motor but insufficient to start said motor, a second alternating current generator having its armature shaft mechanically coupled to the armature shaft of the first generator in such manner that the two generators are always in phase with each other and having a capacity sufficient to start the motor in conjunction with the first generator, a flywheel on the armature shaft of the second generator, switch means responsive to a condition requiring the starting of said motor for connecting the motor in circuit with both said generators, and speed responsive switch means for disconnecting the second generator from said motor when the motor has been started.

4. An electrical power plant comprising an alternating current generator, a current consuming device connected in circuit with the generator, an electric motor, the generator having a capacity sufficient to operate said current consuming device and motor but insufficient to start said motor, a second alternating current generator having its armature shaft mechanically coupled to the armature shaft of the first generator in such manner that the two generators are always in phase with each other and having a capacity sufficient to start the motor in conjunction with the first generator, an internal combustion engine for driving said generators, switch means responsive to a condition requiring the starting of said motor for connecting the motor in circuit with both said generators, and speed responsive switch means for disconnecting the second generator from said motor when the motor has been started.

5. An electrical power plant comprising an alternating current generator, a current consuming device connected in circuit with the generator, an electrical translating device requiring substantially more current to start its operation than to continue its operation after starting, the generator having a capacity sufficient to operate both said devices but insufficient to start said translating device, a second alternating current generator having its armature shaft mechanically coupled to the armature shaft of the first generator in such manner that the two generators are always in phase with each other, said second generator having a capacity sufficient to start operation of said translating device when operating in conjunction with the first generator, switch means responsive to a condition requiring the starting of the operation of said translating device for connecting said translating device in circuit with both said generators, and switch means automatically responsive to the conditions occurring during operation of said translating device for disconnecting the second generator from the translating device when the device has been started.

OGDEN MINTON.